June 29, 1965 A. H. NETHERCOT, JR 3,192,397

BISTABLE CIRCUIT HAVING AN ADJUSTABLE PHASE SHIFTER RESPONSIVE TO OUTPUT SIGNAL

Filed Nov. 30, 1960 3 Sheets-Sheet 1

INVENTOR
ARTHUR H. NETHERCOT, JR.

BY Stephen J. Limanek
ATTORNEY

United States Patent Office 3,192,397
Patented June 29, 1965

3,192,397

BISTABLE CIRCUIT HAVING AN ADJUSTABLE PHASE SHIFTER RESPONSIVE TO OUTPUT SIGNAL

Arthur H. Nethercot, Jr., Hastings on Hudson, N.Y., assignor to International Business Machines Corporation, New York, N.Y., a corporation of New York Filed Nov. 30, 1960, Ser. No. 72,648
17 Claims. (Cl. 307—88.5)

This invention relates to bistable circuits and, more particularly, to improved bistable circuits for use in high speed logical systems.

In recent years there has been described in the literature, phase locked circuits for use in logical machines operating at high speeds and having long life and great reliability. These circuits are designed to provide at least two stable phases of carrier wave energy, each stable phase representing one bit of information. To produce the multi-phase circuits, non-linear capacitance, generally provided by a non-linear capacitance diode, is utilized in one form of these circuits and non-linear inductance, generally provided by a coil wound on a magnetic core, is utilized in another form of these circuits. The first form of these circuits is disclosed in U.S. Patent No. 2,815,488, granted to J. Von Neumann on December 3, 1957, and the second form of these circuits is described in British Patent 788,883, granted July 10, 1957. Circuits exhibiting the principles described in the above-mentioned phase locked circuit have been generally referred to as parametric circuits, for example, parametric oscillators, parametric amplifiers, etc. A comprehensive list of articles on parametric circuits may be found in the May 1960 issue of the Proceedings of the IRE, on pages 848–853.

Parametric circuits have been found to be very useful in the design of electronic computing systems, but it also has been noted that non-linear capacitance diodes of a very high quality are necessary to produce desirable results in the prior art multi-stable parametric circuits and that the non-linear inductance circuits, sometimes called parametrons, do not operate at high frequencies.

An object of this invention is to provide an improved high speed bistable circuit.

Another object of this invention is to provide improved high speed logical circuits which operate at microwave frequencies.

A further object of this invention is to provide a bistable circuit useful in high speed logical systems which is both phase and amplitude bistable.

Yet another object of this invention is to provide improved bistable circuits which may be employed to produce an economical computing system operating at information rates in the order of one kilomegacycle.

In accordance with this invention, a phase comparison bistable circuit is provided which includes a source of carrier wave energy coupled through a pair of parallel transmission lines to means for combining the carrier wave energy transmitted through each of the two lines, an adjustable phase shifter responsive to electrical energy inserted in one of the two lines and means for applying at least a portion of the combined energy to the phase shifter.

An advantage of the circuit of this invention is that a reliable high speed circuit, both amplitude and phase bistable, is provided which does not require the use of relatively expensive non-linear capacitance diodes, yet operates at microwave frequencies in at least the X-band.

The foregoing and other objects, features and advantages of the invention will be apparent from the following more particular description of preferred embodiments of the invention, as illustrated in the accompanying drawings.

Figures 1, 2, 3:
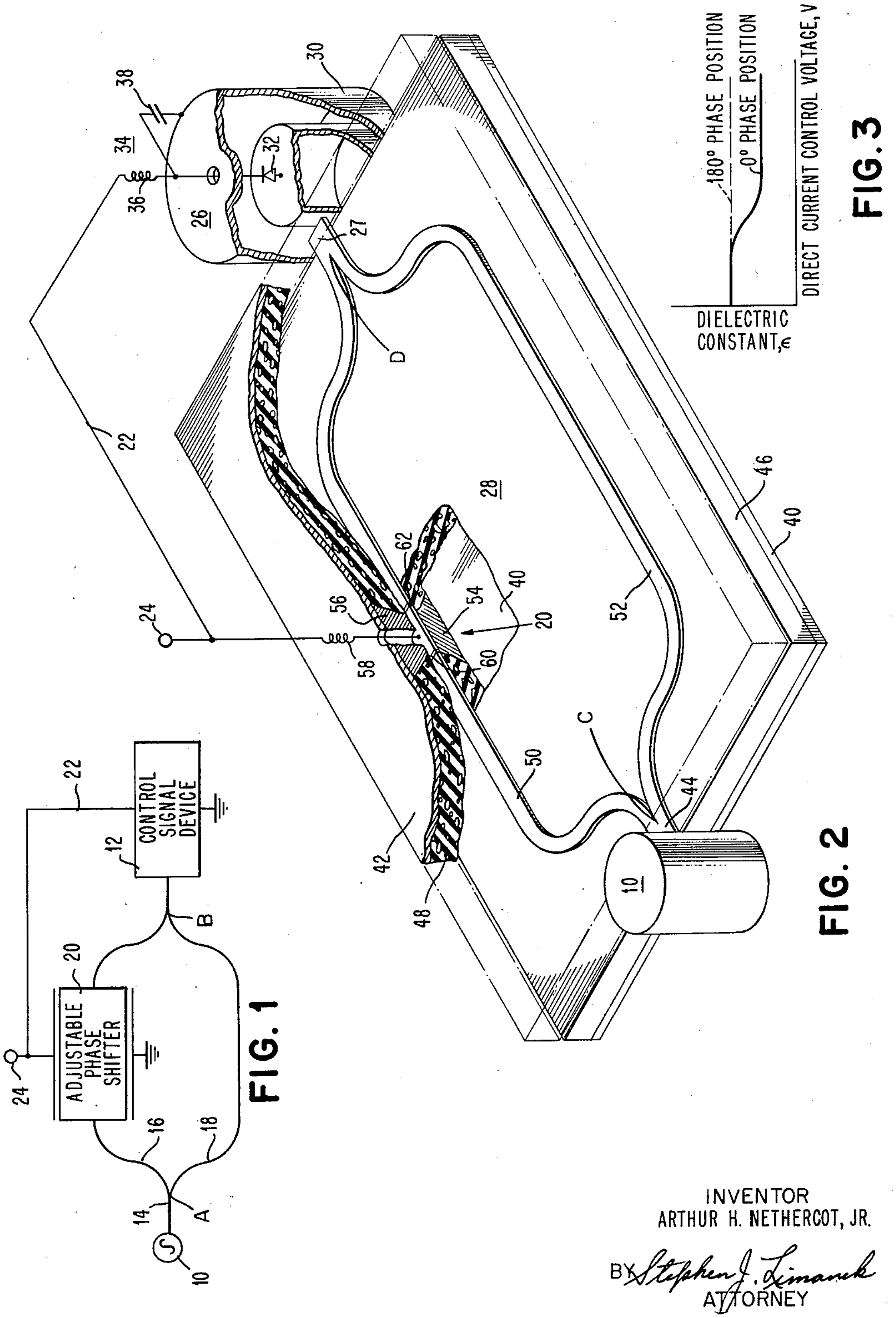
FIG. 1 shows a circuit diagram in block form, of this invention.
FIG. 2 shows a circuit illustrating one embodiment of the invention.
Figure 4:
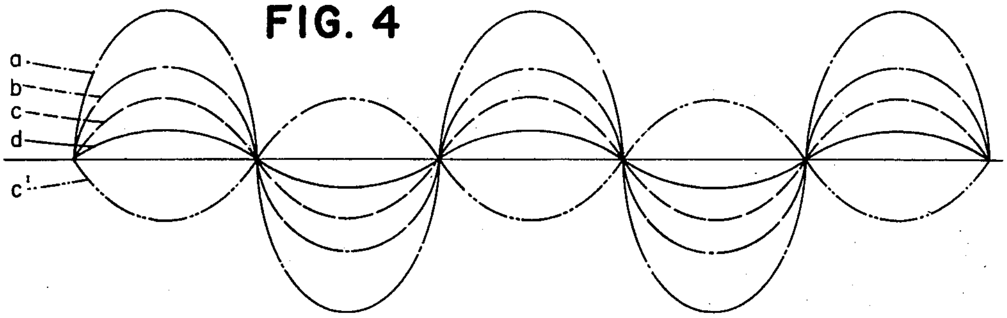
Figure 5:
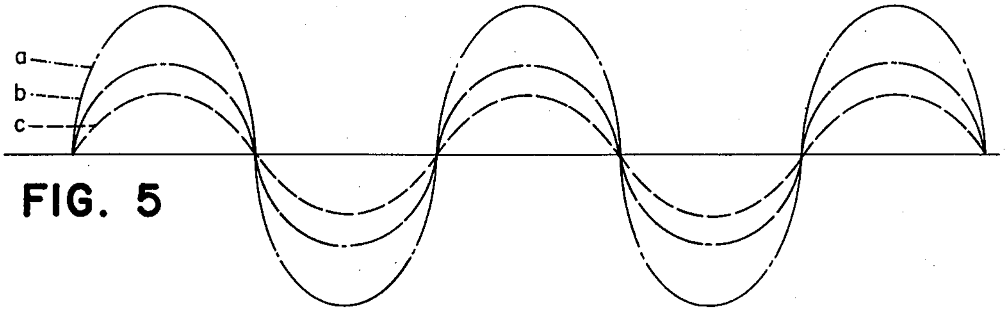
Figure 6:
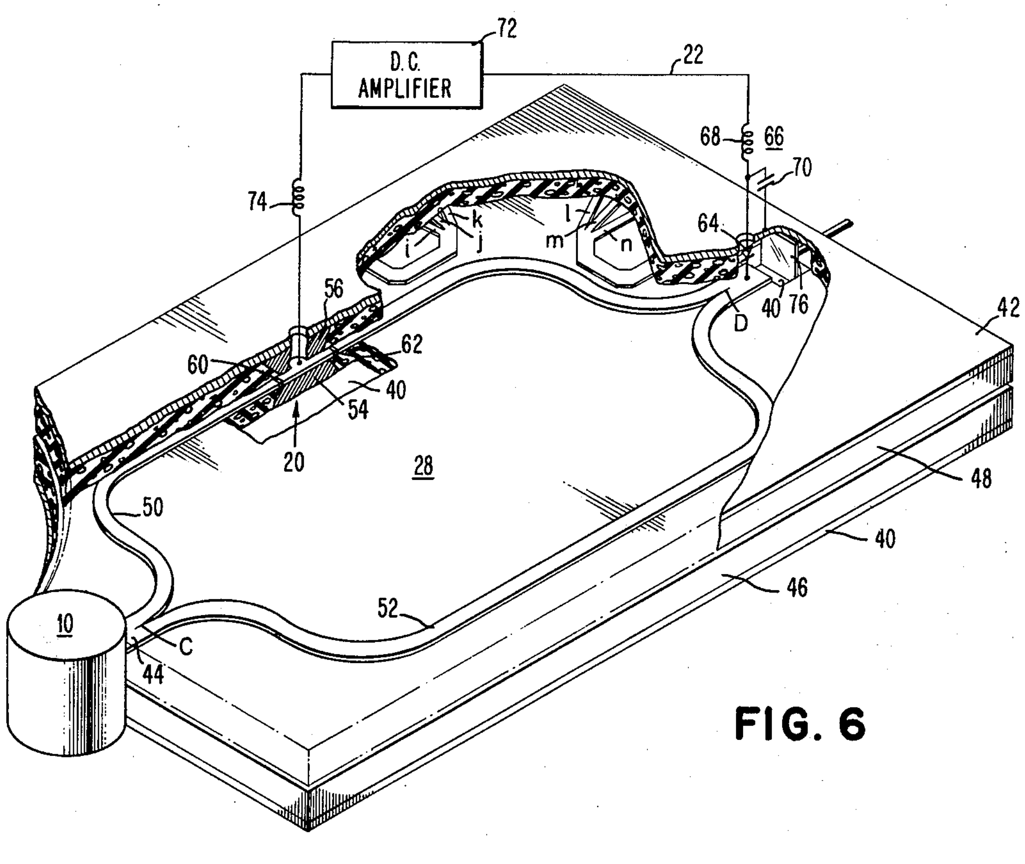
Figure 7:
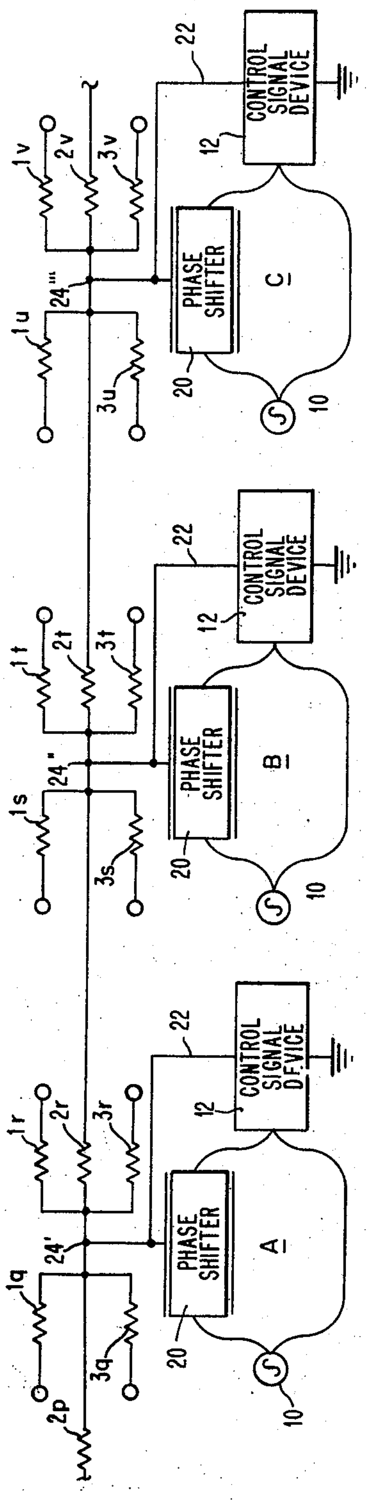
Figure 8:
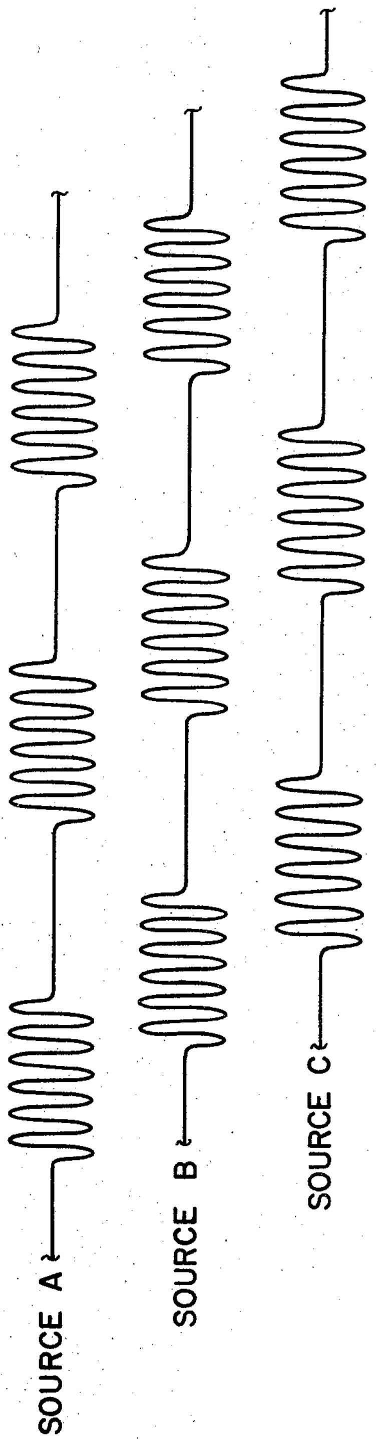

FIG. 3 is a graph showing the variation of dielectric constant of a given material with direct current control voltage, FIG. 4 is a graph of the voltage relationships in the circuits illustrated in FIGS. 1 and 2 for one stable state of operation, FIG. 5 is a graph illustrating the voltage relationships in the circuits illustrated in FIGS. 1 and 2 for the other stable state of operation, FIG. 6 illustrates another embodiment of the circuit of the present invention, FIG. 7 illustrates a plurality of interconnected circuits of the present invention forming a portion of a logical system, and, FIG. 8 indicates the carrier wave energy produced by the oscillators of each of the circuits shown in FIG. 7.

Referring to the drawings in more detail, FIG. 1 illustrates the circuit of this invention in block form. This circuit includes an oscillator 10 coupled to a control signal device 12 through a transmission circuit 14 which is bifurcated at point A to form a first transmission line 16 and a second transmission line 18 which are joined at point B in circuit 14 before being connected to the control signal device 12 and an adjustable phase shifter 20 is inserted in the first transmission line 16 between points A and B of the transmission circuit 14. An output from the control signal device 12 is connected to the adjustable phase shifter 20 through a feedback line 22. A direct current input-output terminal 24 for this circuit is also coupled to the adjustable phase shifter 20. The oscillator 10 may be an X–13 klystron generating a carrier wave at microwave frequencies, preferably in the X-band, and the transmission circuit 14 may be a conventional waveguide, strip transmission line or coaxial cable having suitable dimensions for transmitting the carrier wave produced by oscillator 10. The adjustable phase shifter 20 in transmission line 16 may include a dielectric or magnetic material responsive to an electric or magnetic signal. The speed of propagation of the carrier wave from oscillator 10 through the dielectric or magnetic material of the adjustable phase shifter 20 depends on the electric or magnetic field applied to this material. Hence, the phase of the wave emergent from the adjustable phase shifter 20 depends upon the applied field to the phase shifter 20. Any type of gaseous, liquid or solid material capable of passing a carrier wave without excessive loss may be utilized in the phase shifter 20 since the propagation constant of all known materials depends to some degree on either applied electric or magnetic fields. However, preferred materials are those which are very sensitive to such applied fields. The material used in the phase shifter 20 which has its characteristics varied so as to control the speed of propagation of the carrier wave therethrough, more specifically, may be a ferroelectric plate, post, rod, waveguide or a variable capacitance diode actuated by an applied direct current voltage or a ferrite or garnet type material in the form of sheets, rod, waveguides, or posts actuated by a direct current magnetic field. The variable capacitance diode might best be used upon reflection of the carrier wave energy and the remaining phase shifting materials mentioned hereinabove may be used either upon reflection or transmission of the carrier wave energy.

The control signal device 12 may be a mixing device such as a microwave receiving diode, for example, a 1N23 silicon diode responsive to the carrier wave energy applied thereto. The switching of the bistable circuit from one stable state to the other stable state may be accomplished in many ways, for example, by applying a direct current control voltage to terminal 24 or by superimposing on the emergent carrier wave from the phase shifter 20 a carrier wave of opposite phase.

FIG. 2 illustrates an embodiment of the circuit of this invention in symmetrical strip transmission line form utilizing integration of energy to actuate the phase shifting device. The circuit in FIG. 2 includes the oscillator 10 which is coupled to a control signal device 26 through a strip transmission line circuit 28. The control signal device 26 includes a transformer 30 in the form of a re-entrant cavity, a diode 32 disposed in the high field intensity region of the cavity 30 and a filter 34, including an inductor 36 serially connected with the diode 32 and a capacitor 38 connected in parallel with the diode 32. The strip transmission circuit comprises first and second ground plates 40 and 42, respectively, and a center conductor 44 supported between the first and second ground plates 40 and 42 by first and second layers of dielectric material 46 and 48. For a better understanding of the construction of the strip transmission line circuits, reference may be had to copending U.S. patent application having Serial No. 824,003 filed on June 30, 1959, by G. F. Bland and to Sanders Associates' Handbook of Tri-Plate Microwave Components, 1956 edition. The center conductor 44 is bifurcated at point C to provide first and second transmission lines 50 and 52 which are joined at point D of center conductor 44 before the center conductor 44 is coupled to the control signal device 26 by a probe 27, which may be an extension of center conductor 44, inserted into the low field intensity region of the cavity 30. Inserted in the first strip transmission line 50 is the phase shifter 20 having a first slab 54 of phase shifting dielectric or magnetic material disposed between the first line 50 and the lower ground plate 40 and a second slab 56 of similar dielectric or magnetic material disposed between the first line 50 and the upper plate 42. The filter circuit 34 is coupled through a choke 58 to the first line 50 so as to apply a direct current control voltage to the first and second dielectric slabs 54 and 56. Of course, if desired, the direct current line between choke 58 and the first line 50 may be connected to the first line 50 and arranged so as to lie in a fringe field of the first line 50, thus, reducing to a minimum the amount of carrier wave energy tending to enter into the direct current feedback line 22. First and second direct current insulation inserts 60 and 62, respectively, e.g., mica inserts, are disposed in the first line 50 to prevent the direct current control voltage from being applied through the first line 50 to the oscillator 10 and the control signal device 26.

The two slabs 54 and 56 may be, more particularly, ferroelectric slabs operating at temperatures slightly higher than the Curie temperature. The ends of each of these slabs are tapered to avoid reflections in the transmission line circuit 28 and they have a length which is sufficient to provide 180° phase change when a relatively low voltage is applied across opposite sides of each of the slabs. A length of approximately one inch of a ferroelectric material is sufficient to provide the desired 180° phase change. The variation of dielectric constant with direct current control voltage for typical ferroelectric materials is indicated by the graph shown in FIG. 3. It can be seen from the graph that a high accuracy of control voltage, or other characteristics, is not required in the 0° phase position if the control voltage is sufficiently large. In the 180° phase position, i.e., at low control voltages, a high accuracy may be required, but could be obviated by addition of a rectifying diode across the phase shifter 20 with the diode polarity such that negative voltages could be developed across the phase shifter 20. In this case, a negative control voltage, regardless of magnitude, would give rise to a zero voltage across the phase shifter 20.

In other embodiment of this invention a birefringent device which is described in an article by N. Karayianas and J. C. Cacheris, entitled "Birefringence of Ferrite in Circular Waveguide," published in the Proceedings of the IRE, vol. 44, 1956, pages 1414 to 1421, may be used as the phase shifting device. This birefringent device has a low loss, less than 3db, at 10 kilomegacycles and produces a 180° phase change with an applied direct current magnetic field of 210 oersteds. In still another embodiment of this invention, a gyrator type of device may also be used to provide the 180° phase shift, since a rotation of 180° of the carrier wave is equivalent to a phase change of 180°.

Since the transformer or re-entrant cavity 30 builds up a relatively strong voltage across the diode 32, the circuit may be switched from one stable state to another without the use of an amplifier in the feedback circuit 22 between the control signal device 26 and the slabs 54 and 56. The diode 32 should preferably be a high resistance diode such as a welded contact germanium diode of the type described in the M.I.T. Radiation Laboratory Series on page 21 of volume 15 entitled "Crystal Rectifiers" written by H. C. Torrey and C. A. Whitmer and published by McGraw-Hill Book Company (New York 1948), however, a conventional 1N23 silicon diode may be used. The diode 32 should be mounted in the cavity so that an impedance match is provided between the diode and the cavity. The cavity may be a conventional waveguide or strip line cavity.

In the operation of the circuits illustrated in FIGS. 1 and 2, the oscillator 10 is turned on to produce a voltage *a* illustrated in the graph in FIG. 4 of the drawings, which is applied to point C of the center conductor 44 of the strip transmission line circuit 28. At point C the carrier wave energy is divided into two portions, one portion having a wave *b* illustrated in the graph of FIG. 4, passing through the second transmission line 52 and the second portion having wave *c*, also illustrated in the graph shown in FIG. 4, passing through the first line 50. The waves *b* and *c* passing through second and first lines 52, 50, respectively, are combined at point D in the transmission circuit 28 and then are applied to the cavity 30. The first line 50 including the phase shifter 20 is constructed and arranged so as to have an effective length of 180° or one half of a carrier wave cycle different compared with the length of the second line 52 at point D when the oscillator 10 is turned on so that when the two waves *b* and *c* are combined they will tend to cancel each other at point D of center conductor 44. Thus, the waves which actually combine at point D will appear to be more like waves *b* and *c'*, illustrated in the graph of FIG. 4, which when combined produce a resultant low amplitude wave *d*, also shown in graph of FIG. 4. The relatively low magnitude of voltage *d* when rectified by the diode 32 in cavity 30 will produce but a small direct current voltage across the first and second slabs 54 and 56. The circuit of this invention is designed so that at this low control voltage the phase of the carrier waves passing through the first and second slabs 54 and 56 will be substantially unaffected and the circuit will thus operate in one stable state. When there is applied to slabs 54 and 56 a direct current voltage having a value substantially greater than the direct current voltage produced by the control signal device 26 when the resultant voltage at point D is the relatively low carrier wave *d*, the first and second slabs 54 and 56 will have their characteristics altered so as to produce a 180° phase shift in the carrier wave passing through them to point D in the transmission circuit 28. The 180° phase shift now produced by the first and second slabs 54 and 56 compensates the 180° wave shift caused by the difference in effective lengths of the first and second lines 50 and 52 so as to provide at point D two voltages *b* and *c* which, when combined, will produce a resultant voltage *a*, shown by *a* in FIG. 5 of the drawings, which is equivalent to the voltage transmitted to point *c* of the transmission circuit 28 from oscillator 10. The voltage *a* when applied to the cavity 30 and rectified by the diode 32 will produce a direct current voltage having a magnitude sufficient to maintain in the first and second slabs 54 and 56 the desired 180° phase shift. Thus, it can be seen that a bistable circuit has been provided which is phase bistable in the first line between the slabs 54, 56 and point D of the transmission circuit 28, carrier wave or alternating current amplitude bistable between point D of the transmission circuit 28 and the diode 32 and direct current bistable in the circuit from the diode 32 in cavity 30 through filter 34 and choke 58 to the first line 50 at the slabs 54, 56.

FIG. 6 illustrates another embodiment of the bistable circuit of the present invention. This circuit is similar to the circuit illustrated in FIG. 2, but differs therefrom primarily in that it utilizes amplifying means in the feedback loop rather than a transformer or re-entrant cavity. In the circuit shown in FIG. 6, a diode 64 is inserted in the transmission circuit 28 at the end thereof opposite the end at which the oscillator 10 is connected. The diode 64 is disposed between the first and second ground plates 40 and 42 and is connected between the center conductor 44 and the filter network 66 including an indicator 68 serially connected with the diode 64 and a capacitor 70 connected from the common point between the diode 64 and the inductor 68 to the upper ground plate 42. A direct current amplifier 72 is coupled between the filter network 66 and one terminal of a choke 74, the other terminal of choke 74 being connected to the first transmission line 50 between the two direct current insulation inserts 60, 62. A short circuit termination 76 is provided near the end of the center conductor 44 to which the diode 64 is connected. The short circuit termination 76 may be either fixed or slidably adjustable. The embodiment of the circuit of this invention illustrated in FIG. 6 further includes first, second and third carrier wave signal input lines *i*, *j*, and *k* and three carrier wave signal output lines *l*, *m*, and *n* coupled to the first transmission line 50 which may be connected to other circuits similar to the circuit illustrated in FIG. 6.

The operation of the circuit illustrated in FIG. 6 is similar to that of the circuit illustrated in FIG. 2. The resultant carrier wave voltage applied to the diode 64 is not amplified as it was in the cavity 30 shown in FIG. 2. In the circuit shown in FIG. 6, the resultant carrier wave applied to the diode 64 is rectified and applied to the direct current amplifier 72 through the filter network 66. The direct current amplifier 72 is adjusted so as to amplify the rectified resultant voltage *a*, installed in FIG. 5, to a sufficient value which will produce a 180° phase shift of the carrier wave passing through the first and second slabs 54 and 56 while the rectified resultant voltage *d*, illustrated in FIG. 4, is not amplified sufficiently to produce a relative phase shift of the carrier wave passing through the first and second slabs 54 and 56. The bistable circuit shown in FIG. 6 is switched from one stable state to the other when carrier waves having appropriate phases are applied to the input lines *i*, *j*, and *k*. It can be readily seen that when an input carrier wave having a phase opposite to the phase of the carrier wave in the first transmission line 50 at the point in line 50 at which the input wave is applied thereto overrides the carrier wave originally in the first line 50, the circuit will switch phases. For example, when the circuit is operating in the stable state in which the resultant voltage at point D of center conductor 44 is wave *a* of FIG. 5, the carrier wave in line 50 between phase shifter 20 and point D has the phase and amplitude of wave *c* and the carrier wave in the second line 52 has the phase and amplitude of wave *b*. If an input wave *c'* having an opposite phase to the phase of wave *c*, as shown in FIG. 4, is momentarily applied to wave *c* in line 50 between the phase shifter and point D when the oscillator 16 is first turned on and building up the wave *c*, the wave *c'* cancels out wave *c* and there will be produced at point D a resultant wave, for example wave *b*, which has a magnitude less than the magnitude of the preceding resultant wave, i.e., less than that of wave *a*, so that a decreased direct current voltage is now applied through the filter 66 to the first and second slabs 54 and 56 of phase shifter 20. This decreased direct current voltage on slabs 54 and 56 alters the amount of phase shift produced by the slabs so that the phase of the wave passing through the slabs 54, 56, approaches that of the wave *c'* to further reduce the direct current voltage applied to the first and second slabs 54 and 56. This process continues until the circuit reaches its other stable state when the resultant carrier wave *d* is reached, as illustrated in FIG. 4 of the drawings. It can be seen that when the circuit stabilizes producing the resultant wave *d*, the circuit state can be switched again merely by applying wave *c* to line 50 between phase shifter 20 and point D when the oscillator 10 is again turned on.

It should be understood that the circuits illustrated in FIGS. 2 and 6 may be used to perform various logical functions. For example, the circuit of this invention may be readily adjusted so that energy from one of the input lines *i*, *j* or *k* in FIG. 6 or a line connected to the direct current terminal 24 of the circuit shown in FIG. 2 will be sufficient to switch the circuit from one stable state to the other stable state, thus providing an OR circuit. The circuit of this invention may also be adjusted so that energy from at least two of three input lines will be required to switch the circuit from one stable state to the other stable state, thus providing a majority circuit. Furthermore, the circuit may be adjusted so that energy from all of a plurality of input lines is necessary to switch the circuit from one stable state to the other state, thus providing an AND circuit.

FIG. 7 illustrates a logical system utilizing a plurality of the bistable circuits of the present invention connected in cascade. This system which may be used to perform majority logic includes a plurality of the bistable circuits A, B and C, each of which may be of the type illustrated in FIGS. 2 or 6 and described hereinabove in connection therewith. The bistable circuits are shown in FIG. 7 in the block form used in FIG. 1 of the drawings with the bistable circuit A having a direct current terminal 24' connected to three input circuits 1*q*, 2*p* and 3*q* and three output circuits 1*r*, 2*r* and 3*r*, the bistable circuit B having a direct current terminal 24'' connected to input circuits 1*s*, 2*r* and 3*s* and output circuits 1*t*, 2*t* and 3*t* and the bistable circuit C having a direct current terminal 24''' connected to three input circuits 1*u*, 2*t* and 3*u* and output circuits 1*v*, 2*v* and 3*v*, which outputs may be coupled to additional similar bistable circuits (not shown). In order to transfer the information through the majority logic circuit shown in FIG. 7 in only one direction, the carrier wave from the oscillator 10 of each of the bistable circuits A, B and C may be modulated and the phase of the modulation adjusted so that each succeeding circuit is supplied by a pulse of carrier wave energy having a time duration greater than 120° of a cycle of operation but which is initiated 120° after the initiation of a pulse applied to the immediately preceding circuit and 120° before the initiation of a pulse applied to the immediately succeeding circuit, as indicated in FIG. 8 of the drawings, and as described in more detail in the above-mentioned U.S. Patent 2,815,488 and the British Patent 778,883. The pulses of carrier wave energy identified in FIG. 8 of the drawings as source A are the effective pulses produced by the oscillator 10 in circuit A and similarly, source B and source C indicate the energization of the bistable circuit B and the bistable circuit C, respectively. It can be seen in FIG. 8 that there is a timewise overlapping of the carrier wave energy in a pulse of source A with respect to the carrier wave energy in a pulse of source B. During the overlapping time interval, the information contained in the output of circuit A is transferred to the bistable circuit B along with information being applied to circuit B through input circuits 1*s* and 3*s*. After the energy in source A is turned off and prior to the time that the energy in source B is turned off in circuit B the energy in source C is turned on to transfer the information in circuit B to circuit C along with information being applied to circuit C through input circuits 1*u* and 3*u*. This cycle of operation is again repeated for the next bit of information that is passed through the logical system from circuit A to circuit B and then to circuit C. The bit of information at the output of bistable circuit C may be passed on to similar bistable circuits operated in this same manner. The majority system shown in FIG. 7 can be readily designed so that at least two input signals of a given value are required to produce an output signal in any one of the corresponding bistable circuits A, B or C which is equal to the given input signal value.

Accordingly, it can be seen that a novel, simple and inexpensive high speed bistable circuit has been provided wherein binary information can be represented by the characteristics of electric voltage, namely, by the two stable phases of a carrier wave voltage which can exist in the transmission line 50 between the phase shifter 20 and point D, the two stable magnitudes of direct current voltage in the feedback loop 22 or the two stable amplitude values of carrier wave voltage at point D of the center conductor 44. Such a wide choice of characteristics is particularly of value in large complex electronic computing systems. It can be readily understood that the circuit of this invention can play the role of a transducer between pulse and phase type computer systems or subsystems.

While the invention has been particularly shown and described with reference to preferred embodiments thereof, it will be understood by those skilled in the art that various changes in form and details may be made therein without departing from the spirit and scope of the invention.

What is claimed is:

1. A bistable circuit having two stable states comprising:

a source of carrier wave energy;

a transmission circuit connected at its one end to said energy source, said transmission circuit having a first and second transmission line;

an adjustable phase shifter disposed in said first line, said phase shifter residing in one of at least two states, said states corresponding to two stable conditions of phase relationship between the carrier wave energy in said lines at the other end of said transmission circuit;

a control circuit connected to said other end of said transmission circuit and responsive to said phase relationships for generating an output capable of residing at either of two stable states corresponding to said phase relationships; and means for coupling said output from said control circuit to said phase shifter for maintaining the condition of carrier wave energy phase relationship present at said control circuit.

2. The bistable circuit of claim 1 further including means coupled to said first transmission line intermediate said phase shifter and said control circuit for applying thereto carrier wave energy to alter the existing phase relationship of said waves at said control circuit thereby switching said circuit from one of said stable states to another of said stable states.

3. A bistable circuit as set forth in claim 1 the effective length of each of said lines differs from the other by a distance equal to one half of a wave length of said carrier waves.

4. A bistable circuit as set forth in claim 1 wherein said phase shifter includes means for varying the speed of propagation of said carrier waves.

5. A bistable circuit as set forth in claim 4 wherein said propagation varying means includes dielectric material.

6. A bistable circuit as set forth in claim 4 wherein said propagation varying means includes magnetic material.

7. A bistable circuit as set forth in claim 1 wherein said control signal producing means includes a mixing device.

8. A bistable circuit as set forth in claim 6 wherein said mixing device is a diode responsive to said carrier waves.

9. A bistable circuit as set forth in claim 8, further including means for transforming electric energy of a given intensity to electric energy of a higher intensity.

10. A bistable circuit as set forth in claim 9 wherein said energy transforming means includes a re-entrant cavity.

11. A bistable circuit as set forth in claim 10 wherein said energy transforming means includes a direct current amplifier.

12. A bistable circuit comprising:

a source of carrier wave energy;

first and second transmission lines coupled to said source;

means for combining the energy in said first and second lines at a common point;

means for shifting the phase of the wave in said first line so that said wave in said first line at said common point is an integral number of half wave lengths different from the phase of the wave in said second line at said common point, said means residing in one of at least two states corresponding to two stable conditions of phase relationship between said waves at said common point;

means responsive to said phase relationships of said combined waves at said common point for generating an output residing at either of two stable states; and means for applying the output from said control signal producing means to said phase shifting means for maintaining the condition of carrier wave energy phase relationship present at said control circuit.

13. A circuit having two stable states comprising a source of carrier wave energy, a re-entrant cavity having a low field intensity region and a high field intensity region, a transmission circuit coupling said source to the low field intensity region of said cavity, said transmission circuit being bifurcated at first and second points to provide first and second parallel transmission lines, an adjustable phase shifter disposed in said first line, means for rectifying said carrier wave energy disposed in the high field intensity region of said cavity, means including a filter network for applying the output from said rectifying means to said phase shifter and means for applying a signal to said phase shifter to switch the circuit from one of its two stable states to the other of its two stable states.

14. A circuit having two stable states comprising a source of carrier wave energy, a re-entrant cavity having a low field intensity region and a high field intensity region, a strip transmission line circuit including a center conductor and first and second spaced apart ground plates coupling said source to the low field intensity region of said re-entrant cavity, said center conductor being bifurcated to form first and second transmission lines between two spaced apart points in said center conductor, a phase shifter disposed in said first transmission line, said phase shifter including a first delay element disposed between said center conductor and said first ground plate and a second delay element disposed opposite said first delay element between said center conductor and said second ground plate, a diode responsive to said carrier wave energy disposed in the high field intensity region of said cavity, means including a filter network for applying the output from said diode to said phase shifter and means for applying a direct current input signal to said phase shifter to switch the circuit from one of its two stable states to the other of its two stable states.

15. A circuit having two stable states comprising a source of carrier wave energy, a transmission circuit, a diode responsive to said carrier wave energy disposed in said transmission circuit at one end thereof and connected thereto, the other end thereof being connected to said source, said transmission circuit being bifurcated at first and second points to provide first and second parallel transmission lines, an adjustable phase shifter disposed in said first line, a reflector disposed adjacent the end of said transmission circuit associated with said diode, means including a low pass filter circuit and a direct current amplifier for coupling the output from said diode to said phase shifter, and means for applying a carrier wave signal to said first line between said phase shifter and said diode for switching the circuit from one of its two stable states to the other of its two stable states.

16. A circuit having two stable states comprising a source of carrier wave energy, a strip transmission line circuit including a center conductor and first and second spaced apart ground plates, a diode responsive to said carrier wave energy disposed in said transmission line and connected to one end of said center conductor, the other end of said center conductor being connected to said source of carrier wave energy, said center conductor being bifurcated to form first and second transmission lines between two spaced apart points in said center conductor, a phase shifter disposed in said first transmission line, said phase shifter including a first delay element disposed between said center conductor and said first ground plate and a second delay element disposed opposite said first delay element between said center conductor and said second ground plate, means including a low pass filter and a direct current amplifier for applying the output from said diode to said phase shifter and means for applying an input signal to said first line between said phase shifter and said diode to switch the circuit from one of its two stable states to the other of its two stable states.

17. A circuit comprising a source of carrier wave energy, first and second transmission lines coupled at one end to said source, means for intercoupling the opposite ends of said transmission lines to combine the energy passing through said first and second lines, means disposed in said first transmission line for varying the phase of the wave in said first transmission line with respect to the phase of the wave in said second transmission line at said opposite ends thereof, and means for applying to said phase shifting means first direct current energy for producing a wave having a phase at said opposite end of said first line differing from the phase of the wave in said opposite end of said second line by a half wave length and second direct current energy for producing a wave at said opposite end of said first line in phase with the wave at said opposite end of said second line.

References Cited by the Examiner

UNITED STATES PATENTS

| | | | |
|---|---|---|---|
| 2,593,120 | 4/52 | Dicke | 333—11 |
| 2,607,031 | 8/52 | Denis et al. | 333—17 |
| 2,748,353 | 5/56 | Hogan | 333—246 |
| 2,829,279 | 4/58 | Doeleman | 328—92 |
| 2,912,581 | 11/59 | Lange | 328—92 |
| 2,951,149 | 8/60 | Grieg et al. | 333—11 |
| 2,991,471 | 7/61 | Pritchard | 333—11 |
| 3,013,224 | 12/61 | King | 333—18 |
| 3,038,086 | 6/62 | Sterzer | 328—92 |

HERMAN KARL SAALBACH, *Primary Examiner.*

IRVING L. SRAGOW, *Examiner.*